(12) United States Patent
Sorge et al.

(10) Patent No.: US 9,745,903 B2
(45) Date of Patent: Aug. 29, 2017

(54) DUAL FUEL SYSTEM FOR A COMBUSTION ENGINE

(71) Applicant: GENERAL ELECTRIC COMPANY, Schenectady, NY (US)

(72) Inventors: Gregory Walter Sorge, Waukesha, WI (US); Jared Joseph Wentz, Waukesha, WI (US); Michael Thomas Roll, Milwaukee, WI (US); Amy Ann Lindblad, Milwaukee, WI (US); Jerrold Arthur Pratt, Milwaukee, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 54 days.

(21) Appl. No.: 14/796,768

(22) Filed: Jul. 10, 2015

(65) Prior Publication Data

US 2017/0009670 A1    Jan. 12, 2017

(51) Int. Cl.
*F02D 19/06* (2006.01)
*F02M 21/02* (2006.01)
*F02M 21/04* (2006.01)

(52) U.S. Cl.
CPC ..... *F02D 19/0615* (2013.01); *F02D 19/0647* (2013.01); *F02D 19/0649* (2013.01); *F02D 19/0676* (2013.01); *F02D 19/0678* (2013.01); *F02M 21/0212* (2013.01); *F02M 21/0215* (2013.01); *F02M 21/0218* (2013.01); *F02M 21/04* (2013.01)

(58) Field of Classification Search
CPC ............ F02D 41/0025; F02D 19/081; F02D 41/0027; F02D 19/10; F02D 41/005; F02D 41/3047; F02D 19/0678; F02B 2043/103; F02M 21/04
See application file for complete search history.

(56) References Cited

U.S. PATENT DOCUMENTS

| 3,783,849 A | * | 1/1974 | Bramfitt | ................. F02M 13/06 |
| | | | | 123/179.16 |
| 3,807,377 A | * | 4/1974 | Hirschler, Jr. | ......... F02M 31/18 |
| | | | | 123/179.16 |

(Continued)

OTHER PUBLICATIONS

Application Notes; Waukesha Engine, Dresser, Inc.; No. WED9/97 Rev. 1; pp. 1-2.

(Continued)

*Primary Examiner* — Stephen K Cronin
*Assistant Examiner* — Long T Tran
(74) *Attorney, Agent, or Firm* — Fletcher Yoder, P.C.

(57) ABSTRACT

A dual fuel system for a combustion engine includes an air and fuel mixer configured to mix air and fuel provided to the combustion engine, a first fuel path for a first fuel, and a second fuel path for a second fuel. The first and second fuels have different physical and chemical properties. The dual fuel system also includes a common fuel path coupled to the air and fuel mixer and both the first and second fuel paths, wherein the common fuel path includes an electronically controlled valve configured to regulate the air to fuel ratio of an air/fuel mixture provided to the combustion engine in response to control signals from a controller, and both the first and second fuel paths are coupled to the common fuel path at a location upstream of the electronically controlled valve.

20 Claims, 4 Drawing Sheets

(56) References Cited

U.S. PATENT DOCUMENTS

| | | | |
|---|---|---|---|
| 7,533,634 B2* | 5/2009 | Ritter | F02B 29/0418 123/27 GE |
| 7,627,416 B2 | 12/2009 | Batenburg et al. | |
| 7,861,696 B2* | 1/2011 | Lund | F02B 69/02 123/525 |
| 2002/0185086 A1* | 12/2002 | Newman | F02D 19/0647 123/1 A |
| 2009/0320789 A1* | 12/2009 | Lund | F02B 69/02 123/299 |
| 2010/0206249 A1* | 8/2010 | Bromberg | F02B 17/00 123/3 |
| 2014/0246508 A1* | 9/2014 | Caley | F02M 43/04 239/5 |

OTHER PUBLICATIONS

Application Note 36719; L-Series Air-Fuel Ratio Controller Configuration Instructions for Bi-Fuel Applications; 2008; pp. 1-26.

* cited by examiner

DUAL FUEL SYSTEM FOR A COMBUSTION ENGINE

BACKGROUND

The subject matter disclosed herein relates to combustion engines, and more specifically, to dual fuel systems for combustion engines.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Accordingly, the carbonaceous fuel is transformed into mechanical motion, useful in driving a load. Certain combustion engines are coupled to multi-fuel systems that enable the transfer from one fuel to another. During transfers between different fuels, combustion engines may experience a significant decrease in engine load, increased fuel consumption, and/or increased emissions. In addition, managing the use of the different fuels during engine operation may be complex and/or costly.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with a first embodiment, a dual fuel system for a combustion engine includes an air and fuel mixer configured to mix air and fuel provided to the combustion engine, a first fuel path for a first fuel, and a second fuel path for a second fuel. The first and second fuels have different physical and chemical properties. The dual fuel system also includes a common fuel path coupled to the air and fuel mixer and both the first and second fuel paths, wherein the common fuel path includes an electronically controlled valve configured to regulate the air to fuel ratio of an air/fuel mixture provided to the combustion engine in response to control signals from a controller, and both the first and second fuel paths are coupled to the common fuel path at a location upstream of the electronically controlled valve.

In accordance with a second embodiment, a system includes a dual fuel system configured to couple to a combustion engine. The dual fuel system includes an air and fuel mixer configured to mix air and fuel provided to the combustion engine, a first fuel path for a first fuel, and a second fuel path for a second fuel. The first and second fuels have different physical and chemical properties. The dual fuel system also includes a common fuel path coupled to the air and fuel mixer and both the first and second fuel paths. The dual fuel system further includes a first electronically controlled valve configured to regulate the air to fuel ratio of an air/fuel mixture provided to the combustion engine in response to control signals from a controller. The system also includes the controller coupled to the air and fuel mixer and the first electronically controlled valve. The controller is programmed to regulate a flow of fuel from the dual fuel system to the combustion engine. The controller is also programmed to change between the first and second fuels during operation of the combustion engine while avoiding operating the combustion engine on a blend of the first and second fuels.

In accordance with a third embodiment, a dual fuel system for a combustion engine includes an air and fuel mixer configured to mix air and fuel provided to the combustion engine. The dual fuel system also includes a first fuel path for a first fuel that includes a first fuel gas regulator configured to control a first pressure of the first fuel in relation to an air pressure of the air and fuel mixer and a first fuel manually adjusted valve. The dual fuel system further includes a second fuel path for a second fuel that includes a second fuel gas regulator configured to control a second pressure of the second fuel in relation to an air pressure of the air and the fuel mixer and a second fuel manually adjusted valve. The first and second fuels have different physical and chemical properties. The dual fuel system also includes a common fuel path coupled to the air and fuel mixer and both the first and second fuel paths, wherein the common fuel path includes an electronically controlled valve configured to regulate the air to fuel ratio of an air/fuel mixture provided to the combustion engine in response to control signals from a controller, and both the first and second fuel paths are coupled to the common fuel path at a location upstream of the electronically controlled valve. The first and second manually adjusted valves and the first and second gas regulators together are configured to enable the electronically controlled valve to remain within a control range for both engine operating speeds and loads whether the combustion engine is operating under the first fuel or the second fuel.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
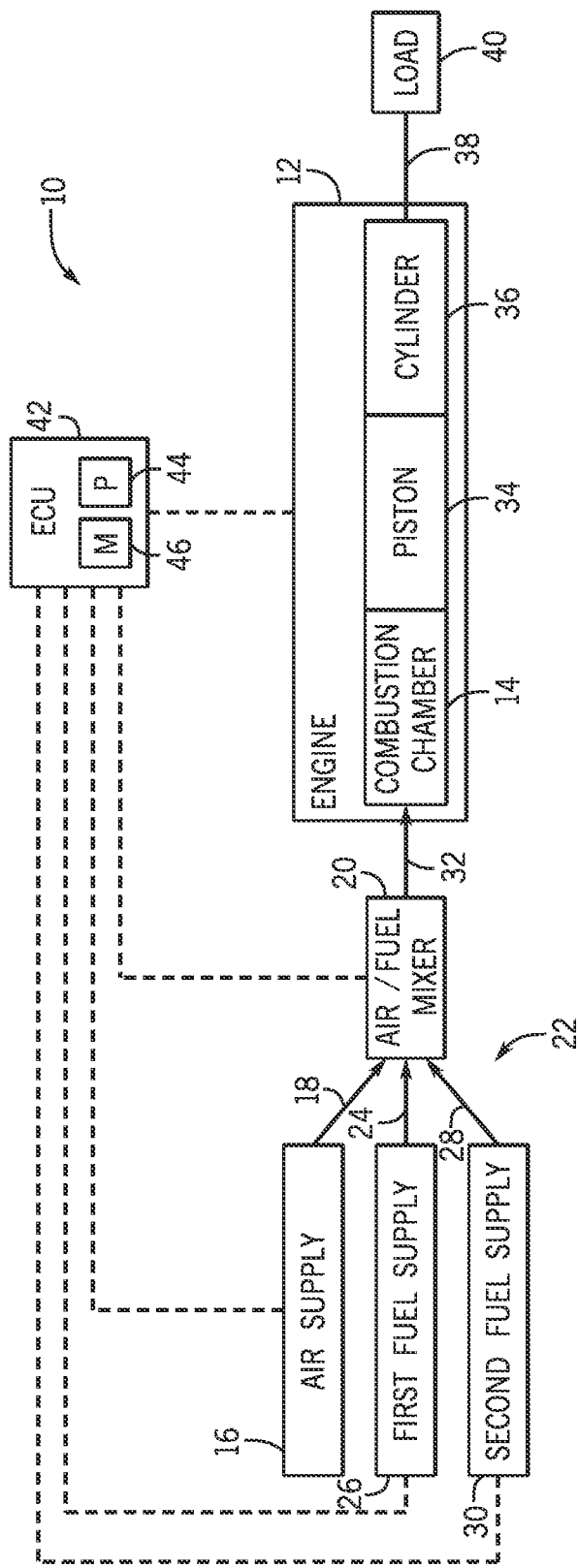
FIG. 1 is a block diagram of an embodiment of a portion of an engine driven power generation system having a dual fuel system in accordance with aspects of the present disclosure.

One or more specific embodiments of the present subject matter will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for managing or controlling the use of multiple fuels (e.g., having different physical and chemical properties) with a combustion engine (e.g., a spark-ignited gaseous fuel internal combustion engine). Embodiments of the present disclosure include a dual fuel system coupled to a combustion engine. The dual fuel system includes an air and fuel mixer (e.g., carburetor) that mixes air and fuel provided to the combustion engine. The dual fuel system also includes a first fuel path for a first fuel (e.g., gaseous fuel such natural gas) and a second fuel path for a second fuel (e.g., gaseous fuel such as propane) having different physical and chemical properties (e.g., chemical heat content, specific gravity, Wobbe Index, etc.) from the first fuel. The dual fuel system further includes a common fuel path coupled to the air and fuel mixer and both the first and second fuel paths (e.g., at a location upstream of the air and fuel mixer). In certain embodiments, the common fuel path includes an electronically controlled valve (e.g., fuel control valve) that regulates (e.g., maintains) the air to fuel ratio (or lambda (λ) or equivalence ratio, i.e., ratio of actual AFR to stoichiometric AFR) of an air/fuel mixture provided to the combustion engine in response to control signals from a controller. Both the first and second fuel paths may be coupled to the common fuel path at a location upstream of the electronically controlled valve. The first and second fuel paths may include a gas pressure regulation system (e.g., respective gas regulators) to control a pressure of the respective fuels in the first and second fuel paths. The dual fuel system may also include a mechanical tuning system to mechanically tune a performance of first and second fuel paths to minimize an amount of adjustment by the electronically controlled valve to regulate (e.g., maintain) the air to fuel ratio. A controller may be coupled to the combustion engine and/or components of the dual fuel system (e.g., air and fuel mixer, electronically controlled valve, on/off valves, etc.). The controller may be programmed to change between the first and second fuels during operation of the combustion engine while avoiding operating the combustion engine on a blend of the first and second fuels. In addition, the controller in conjunction with the gas pressure regulation system and the mechanical tuning system may enable the electronically controlled valve to remain within a control range for both engine operating speeds and loads whether the combustion engine is operating under the first fuel or the second fuel. The disclosed embodiments enable changing between the first and second fuels with a minimal reduction in engine load. In addition, the disclosed embodiments enable a smooth transition between the different fuels while maintaining electronic control of the air to fuel ratio to minimize emissions and fuel consumption.

Turning to the drawings, FIG. 1 illustrates a block diagram of an embodiment of a portion of an engine driven power generation system 10. As described in detail below, the system 10 includes an engine 12 having one or more combustion chambers 14 (e.g., 2, 3, 4, 5, 6, 7, 8, 10, 12, 14, 16, 18, 20, or more combustion chambers 14). The engine 12 may include a reciprocating or piston engine (e.g., internal combustion engine). The engine 12 may include a spark-ignition engine. An air supply 16 is configured to provide a pressurized oxidant 18, such as air, oxygen, oxygen-enriched air, oxygen-reduced air, or any combination thereof, to each combustion chamber 14 via an air and fuel mixer 20 (e.g., carburetor). The combustion chamber 14 is also configured to receive, via a dual fuel system 22, a first fuel 24 (e.g., a gaseous fuel) from a first fuel supply 26 or a second fuel 28 (e.g., gaseous fuel or liquid fuel converted to a gaseous fuel) from a second fuel supply 30. The first and second fuels 24, 28 include different physical and chemical properties (e.g., natural gas versus propane). For example, the fuels 24, 28 may include different chemical heat contents, Wobbe Indexes, specific gravities, and/or other properties. In certain embodiments, the first fuel 24 may be the primary fuel utilized by the engine 12, while the second fuel 28 may be the secondary fuel. In certain embodiments, the first fuel 24 may include both a lower chemical content and Wobbe Index than the second fuel 28. As result, the first fuel 24 may regulated at a higher pressure by the dual fuel system 22 than the second fuel 28. A fuel-air mixture 32 ignites and combusts within each combustion chamber 14. The hot pressurized combustion gases cause a piston 34 adjacent to each combustion chamber 14 to move linearly within a cylinder 36 and convert pressure exerted by the gases into a rotating motion, which causes a shaft 38 to rotate. Further, the shaft 38 may be coupled to a load 40, which is powered via rotation of the shaft 38. For example, the load 40 may be any suitable device that may generate power via the rotational output of the system 10, such as an electrical generator. Additionally, although the following discussion refers to air as the oxidant 16, any suitable oxidant may be used with the disclosed embodiments. Similarly, the fuels 24, 28 may be any suitable gaseous fuel, such as natural gas, associated petroleum gas, propane, biogas, sewage gas, landfill gas, coal mine gas, for example.

The system 10 disclosed herein may be adapted for use in stationary applications (e.g., in industrial power generating engines) or in mobile applications (e.g., in cars or aircraft). The engine 12 may be a two-stroke engine, three-stroke engine, four-stroke engine, five-stroke engine, or six-stroke engine. The engine 12 may also include any number of combustion chambers 14, pistons 34, and associated cylinders (e.g., 1-24). For example, in certain embodiments, the system 10 may include a large-scale industrial reciprocating engine having 4, 6, 8, 10, 16, 24 or more pistons 34 reciprocating in cylinders 36. In some such cases, the cylinders 36 and/or the pistons 34 may have a diameter of between approximately 13.5-34 centimeters (cm). In some embodiments, the cylinders 36 and/or the pistons 34 may have a diameter of between approximately 10-40 cm, 15-25 cm, or about 15 cm. The system 10 may generate power ranging from 10 kW to 10 MW. In some embodiments, the engine 12 may operate at less than approximately 1800 revolutions per minute (RPM). In some embodiments, the engine 12 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 12 may operate between approximately 750-2000 RPM, 900-1800 RPM, or 1000-1600 RPM. In some embodiments, the engine 12 may operate at approximately 1800 RPM, 1500 RPM, 1200 RPM, 1000 RPM, or 900 RPM. Exemplary engines 12 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The dual fuel system 22 includes one or more electronically controlled valves (e.g., fuel control valves) configured to regulate (e.g., maintain a desired air to fuel ratio or lambda) the air to fuel ratio of the air/fuel mixture 32 provided to the engine 12 in response to control signals from a controller. The engine driven power generation system 10 may include an engine control unit 42 (e.g., ECU) coupled to the engine 12, different components of the dual fuel system 22 (e.g., air and fuel mixer 20, mechanical tuning system (e.g., manually adjusted valves), gas pressure regulation system (e.g., gas regulators), electronically controlled valve(s), on/off valves, etc.), and one or more sensors disposed throughout the system 10. In certain embodiments, the components of the dual fuel system 22 may be coupled to one or more controllers separate from the ECU 42 or both the ECU 42 and the one or more controllers. The ECU 42 controls engine operations as well as regulates the use and transfer between the different fuels 24, 28 of the dual fuel system 22. The ECU 42, in conjunction with the dual fuel system 22, enables a change between the first and second fuels 24, 28 during operation of the engine 12 while avoiding operating the engine 12 on a blend of the first and second fuels 24, 28. The ECU 42 may monitor one or more process parameters (e.g., pressure of the first fuel 24) that may via a single switch or relay trigger a change between the first and second fuels 24, 28. For example, the monitored process parameter may trigger the change between the fuels 24, 28 upon falling below a threshold, rising above a threshold, falling within a range, or falling out of a range. The ECU 42 when changing between the fuels 24, 28 during operation of the engine 12 may also change engine ignition timing and desired air to fuel ratio to an appropriate engine ignition timing and an appropriate desired air to fuel ratio for whichever of the first and second fuels 24, 28 is oncoming to the engine 12. Components of the dual fuel system 22 may together, in embodiments with a single electronically controlled valve, enable the electronically controlled valve to remain within a control range for both engine operating speeds and loads whether the engine 12 is operating under first fuel 24 or the second fuel 28.

The ECU 42 includes a processor 44 and a memory 46 (e.g., machine-readable medium). The ECU 25 may include the processor 44 or multiple processors. The processor 44 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 44 may include one or more reduced instruction set (RISC) processors or complex instruction set (CISC) processors. The processor 44 may execute instructions or non-transitory code. These instructions may be encoded in programs or code stored in a tangible non-transitory computer-readable medium, such as the memory 46 and/or other storage. The memory 46, in the embodiment, includes a computer readable medium, such as, without limitation, a hard disk drive, a solid state drive, diskette, flash drive, a compact disc, a digital video disc, random access memory (RAM and/or flash RAM), and/or any suitable storage device that enables the processor 44 to store, retrieve, and/or execute instructions (e.g., software or firmware) and/or data (e.g., thresholds, ranges, etc.). The memory 46 may include one or more local and/or remote storage devices.

Figure 2:
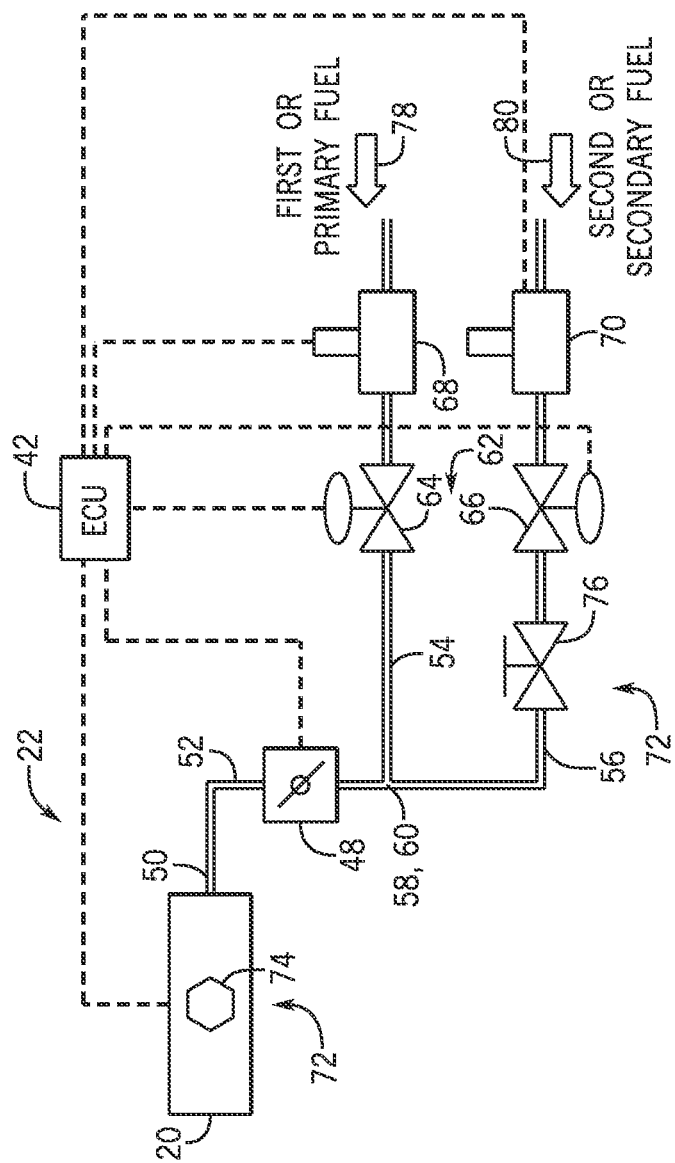
FIG. 2 is a block diagram of an embodiment of a dual fuel system (e.g., having a single electronically controlled valve) in accordance with aspects of the present disclosure.

FIG. 2 illustrates a block diagram of an embodiment of the dual fuel system 22 (e.g., having a single electronically controlled valve 48). The dual fuel system 22 may be coupled to the engine 12 described in FIG. 1. The dual fuel system 22 includes the air and fuel mixer 20 (e.g., carburetor) coupled to a first end 50 (e.g., upstream relative to the mixer 20) of a common fuel path 52. The dual fuel system 22 also includes a first fuel path 54 (e.g., primary fuel path) for the first fuel 24 and a second fuel path 56 (e.g., secondary fuel path) for the second fuel 28. Both the first and second fuel paths 54, 56 are coupled to a second end 58 of the common fuel path 52 at a location 60 (e.g., tee connection) upstream of the path 52 and air and fuel mixer 20.

As depicted, the common fuel path 52 includes the electronically controlled valve 48 (e.g., fuel control valve). The electronically controlled valve 48 may be located between (i.e., downstream of) the air and fuel mixer 20 and (i.e., upstream of) the location 60 where both the first and second fuel paths 54, 56 meet the common fuel path 52. The electronically controlled valve 48 in response to control signals from the ECU 42 regulates (e.g., maintains) a desired air to fuel ratio or lambda of an air/fuel mixture (e.g., either having the first fuel 24 or the second fuel 28) provided to the engine 12. In certain embodiments, both the first and second fuel paths 54, 56 may include an electronically controlled valve, instead of the common fuel path 52 (see FIG. 3). In other embodiments (e.g., when there are exemptions for emissions requirements when running the second fuel 28), the electronically controlled valve 48 may be located along the first fuel path 54 and used solely for regulating (e.g., maintaining) the desired air to fuel ratio or lambda of the first fuel 24.

The dual fuel system 22 includes a gas pressure regulation system 62. The gas pressure regulation system 22 controls or regulates the respective pressures of the first and second fuels 24, 28. The gas pressure regulation system 62 includes a first gas regulator 64 (e.g., gas pressure regulator valve) and a second gas regulator 66 (e.g., gas pressure regulator valve) disposed along the first and second fuel paths 54, 56, respectively. The first and second gas regulators 64, 66 control or regulate the pressures of the first and second fuels 24, 28, respectively. The first gas regulator 62 is disposed along the first fuel path 54 between the location 60 and on/off valve 68 (i.e. downstream of both the on/off valve 68 and the first fuel supply 26). The second gas regulator 66 is disposed along the second fuel path 56 between the location 60 and on/off valve 70 (i.e., downstream of both the on/off valve 70 and the second fuel supply 30). As depicted, the ECU 42 is electronically coupled to and controls the gas regulators 64, 66. In certain embodiments, the ECU 42 is not coupled to the gas regulators 64, 66.

The dual fuel system 22 also includes a mechanical tuning system 72. The mechanical tuning system 72 mechanically tunes the performance of both the first and second fuel paths 54, 56 to minimize an amount of adjustment by the electronically controlled valve 48 to regulate (e.g., maintain) the air to fuel ratio. The mechanical tuning system 72 includes a first fuel mechanically adjusted valve 74 that tunes the performance of the first fuel path 54 and/or common fuel path 52. As depicted, the valve 74 is disposed at the air and fuel mixer 20. In certain embodiments, the valve 74 may be disposed along the common fuel path 52 between the air and fuel mixer 20 and the location 60. In other embodiments, the valve may be disposed along the first fuel path 54 between the location 60 and the gas regulator 64. The mechanical tuning system 72 also includes a second fuel mechanically adjusted valve 76 that tunes the performance of the second fuel path 56. The valve 76 is disposed along the second fuel path 56 between the location 60 and the gas regulator 66. The valves 74, 76 may include fixed restrictor valves or gates valves. The mechanical tuning system 72 and the gas pressure regulation system 62, acting together, enable the electronically controlled valve 48 to remain within a control range for both engine operating speeds and loads whether the engine 12 is operating under the first fuel 24 or the second fuel 28.

The dual fuel system 22 further includes the first on/off valve 68 (e.g., shut-off valve) disposed along the first fuel path 54 between the gas regulator 64 and the first fuel supply 26. The system 22 also includes the second on/off valve 70 (e.g., shut-off valves) disposed along the second fuel path 56 between the gas regulator 66 and the second fuel supply 30. The on/off valves 68, 70 are configured to open and close to regulate a flow of the first and second fuels 24, 28 through the first and second fuel paths 54, 56 and the common fuel path 52. In certain embodiments, due to the pressure of the first fuel 24 being regulated at a higher pressure than the second fuel 28, the second fuel path 56 may not include the on/off valve 70. The ECU 42 is electronically coupled to and controls the on/off valves 68, 70.

As mentioned above, the ECU 42 is programmed to change between the first and second fuels 24, 26 during operation of the engine 12 to avoid operating the engine 12 on a blend of the first and second fuels 24, 28. For example, the ECU 42 is programmed (when transitioning from the second fuel 28 to the first fuel 24) to simultaneously begin opening the first on/off valve 68 and closing the second on/off valve 70 to enable flow of the first fuel 24 along both the first fuel path 54 and the common fuel path 52 to the air and fuel mixer 20 as indicated by arrow 78. The ECU 42 is also programmed (when transitioning from the first fuel 24 to the second fuel 28) to simultaneously begin opening the second on/off valve 70 and closing the first on/off valve 68 to enable flow of the second fuel 28 along both the second fuel path 56 and the common fuel path 52 to the air and fuel mixer 20 as indicated by arrow 80. In certain embodiments, in opening and closing of the on/off valves 68, 70, over a short interval (e.g., 5 seconds or less) both the on/off valves 68,70 may be open or closed in order to avoid over or under fueling the engine 12 during a change in fuels, thus, improving engine stability during the fuel change.

As described above, the first and second fuels 24, 28 include different physical and chemical properties (e.g., natural gas versus propane). For example, the fuels 24, 28 may include different chemical heat contents, Wobbe Indexes, specific gravities, and/or other properties. In certain embodiments, the first fuel 24 (e.g., natural gas including primarily methane along with in lesser quantities ethane, propane, and other heavier hydrocarbons) may be the primary fuel utilized by the engine 12, while the second fuel 28 (e.g., propane) may be the secondary fuel. In certain embodiments, the first fuel 24 may include both a lower chemical content and Wobbe Index than the second fuel 28. As result, the first fuel 24 may regulated at a higher pressure by the dual fuel system 22 than the second fuel 28. In embodiments, where the first fuel 24 is regulated at a higher pressure, the second fuel path may not include the second on/off valve 70. Instead, when the on/off valve 68 for the first fuel path 54 is open the pressure of first fuel 24 within the first fuel path 54 and the common path 52 will block the flow of the second fuel 28 out of the second fuel path 56.

Also, the ECU 42 may monitor one or more process parameters (e.g., pressure of the first fuel 24) that may via a single switch or relay trigger a change between the first and second fuels 24, 28. For example, the monitored process parameter may trigger the change between the fuels 24, 28 upon falling below a threshold, rising above a threshold, falling within a range, or falling out of a range. Further, the ECU 42 when controlling the changing between the fuels 24, 28 during operation of the engine 12 may also change engine ignition timing and desired air to fuel ratio to an appropriate engine ignition timing and an appropriate desired air to fuel ratio for whichever of the first and second fuels 24, 28 is oncoming to the engine 12.

Figure 3:
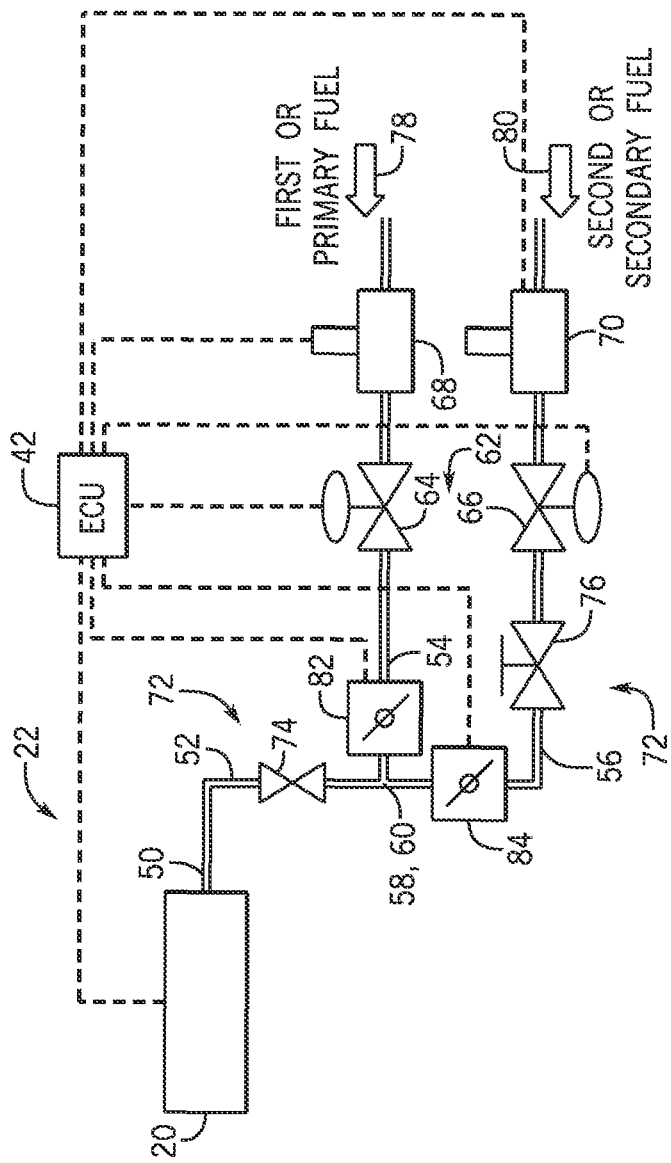
FIG. 3 is a block diagram of an embodiment of a dual fuel system (e.g., having two electronically controlled valves) in accordance with aspects of the present disclosure.

FIG. 3 illustrates a block diagram of an embodiment of the dual fuel system 22 (e.g., having two electronically controlled valves). The dual fuel system 22 is as described in FIG. 2 with a couple of exceptions. As depicted, the first fuel manually adjusted valve 74 is located along the common fuel path 52 between the air and fuel mixture 20 and the location 60. In addition, each of the fuel paths 54, 56 includes an electronically controlled valve coupled to the ECU 42. The first fuel path 54 includes the first electronically controlled valve 82 (e.g., fuel control valve) disposed between the location 60 and the first fuel gas regulator 64. The second fuel path 56 includes the second electronically controlled valve 84 (e.g. fuel control valve) disposed between the location 60 and the second fuel gas regulator 66. Thus, the electronically controlled valves 82, 84 may separately regulate (e.g., maintain) the desired air to fuel ratio or lambda with regard to the first and second fuels 28, 28, respectively.

Figure 4:
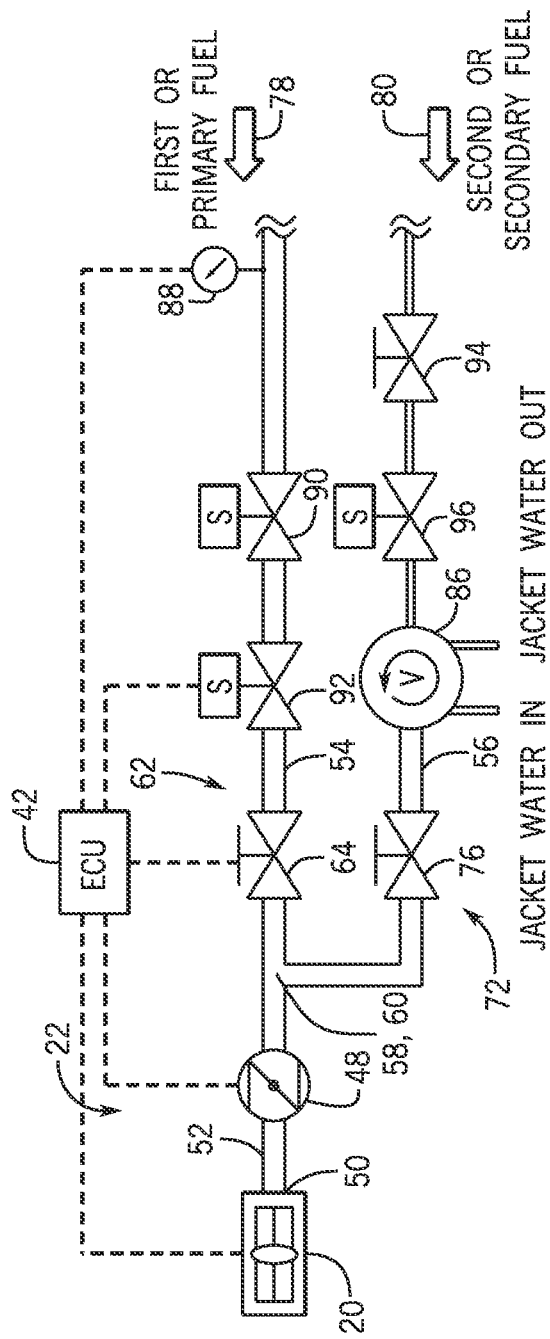
FIG. 4 is a block diagram of an embodiment of a dual fuel system (e.g., having a vaporizer) in accordance with aspects of the present disclosure.

FIG. 4 illustrates a block diagram of an embodiment of the dual fuel system 22 (e.g., having a vaporizer 86). The dual fuel system 22 includes the electronically controlled valve 48 that functions as described above. The first fuel path 54 includes a sensor 88 (e.g., pressure transducer) located downstream of the first fuel supply 26 for the first fuel 24 (e.g., gaseous fuel). The first fuel path 54 also includes a first solenoid valve 90 (e.g., ESM driven solenoid valve) and a second solenoid valve 92 (e.g., ECM driven solenoid valve) disposed in series along the first fuel path 54. The first fuel path 54 also includes the first fuel gas regulator 64, described above, disposed between the location 60 and the solenoid valve 92. The second fuel path 56 includes a manual valve 94 (e.g., shut-off valve) located downstream of the second fuel supply 30 for the second fuel (e.g., liquid fuel). The second fuel path 56 also includes a solenoid valve (e.g., ESM driven solenoid valve) disposed between the valve 94 and the vaporizer 86. The second fuel path 56 includes the vaporizer 86 disposed between the solenoid valve 96 and the second fuel manually adjusted valve 76. The valve 76 is disposed along the second fuel path 56 between the location 60 and the vaporizer 86.

The sensor 88 monitors the pressure of the first fuel 24 and communicates with the valve 90. Alternatively or additionally, the sensor 88 may communicate with the ECU 42, which is coupled to the valve 92. In certain embodiments, if the pressure of the first fuel 24 falls below a certain threshold, the solenoid valve 90 and/or the solenoid valve 92 may be closed to block the flow of the first fuel 24 through the first fuel path 54. The valve 64 functions as described above.

In the second fuel path 56, the valve 94 may be opened or closed manually to control the flow of the second fuel 28 along the path 56. Alternatively or additionally, the solenoid valve 96 (which may communicate with the sensor 88) may be open if the pressure of the first fuel 24 falls below a certain threshold and closed if the pressure of the first fuel 24 remains at or above the threshold. The vaporizer 86 converts the liquid second fuel 28 to a gaseous state. Valve 76 may function as described above.

In certain embodiments, the second fuel path 56 may include a tee connection located downstream of the vaporizer 86, where the tee connection is coupled to a fluid conduit having a relief valve that enables the pressure within the second fuel path 56 to be regulated. In certain embodiments, the second fuel path 56 may include also include one or more electronic fuel shut-off valves located downstream of both the vaporizer and the tee connection.

Technical effects of the disclosed embodiments include providing a system that includes a controller (e.g., ECU 42) and a dual fuel system 22 having the electronically controlled valve 48 that enables a change between the first and second fuels 24, 28 during operation of the combustion engine 12 while avoiding operating the combustion engine 12 on a blend of the first and second fuels 24, 28. In addition, the controller in conjunction with the gas pressure regulation system 62 and the mechanical tuning system 72 may enable the electronically controlled valve 48 to remain within a control range for both engine operating speeds and loads whether the combustion engine 12 is operating under the first fuel 24 or the second fuel 28. The disclosed embodiments enable changing between the first and second fuels 24, 28 with a minimal reduction in engine load. In addition, the disclosed embodiments enable a smooth transition between the different fuels while maintaining electronic control of the air to fuel ratio to minimize emissions and fuel consumption.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A dual fuel system for a combustion engine, comprising:
   an air and fuel mixer configured to mix air and fuel provided to the combustion engine;
   a first fuel path for a first fuel;
   a second fuel path for a second fuel, wherein the first and second fuels have different physical and chemical properties; and
   a common fuel path coupled to the air and fuel mixer and both the first and second fuel paths, wherein the common fuel path comprises an electronically controlled valve configured to regulate the air to fuel ratio of an air/fuel mixture provided to the combustion engine in response to control signals from a controller, both the first and second fuel paths are coupled to the common fuel path at a location upstream of the electronically controlled valve, and the electronically controlled valve is located upstream of where the common fuel path is coupled to the air and fuel mixer.

2. The dual fuel system of claim 1, wherein the first fuel path comprises a first fuel gas regulator configured to control a first pressure of the first fuel in relation to an air pressure of the air and fuel mixer, and the second fuel path comprises a second fuel gas regulator configured to control a second pressure of the second fuel in relation to the air of the air and fuel mixer.

3. The dual fuel system of claim 2, comprising a first fuel manually adjusted valve disposed at the air and fuel mixer or between the air and fuel mixer and the first fuel gas regulator along either the common fuel path or the first fuel path, wherein the first fuel manually adjusted valve is configured to mechanically tune a performance of the first fuel path to minimize an amount of adjustment by the electronically controlled valve to regulate the air to fuel ratio.

4. The dual fuel system of claim 3, wherein the second path comprises a second fuel manually adjusted valve disposed between the second fuel gas regulator and the location where both the first and second fuel paths are coupled to the common fuel path, wherein the second fuel manually adjusted valve is configured to mechanically tune a performance of the second fuel path to minimize an amount of adjustment by the electronically controlled valve to regulate the air to fuel ratio.

5. The dual fuel system of claim 4, wherein the first fuel path comprises a first on/off valve disposed upstream of the first fuel gas regulator and configured to open and close to regulate a flow of the first fuel through the first fuel path in response to the control signals from the controller.

6. The dual fuel system of claim 5, comprising the controller coupled to the combustion engine, the air and fuel mixer, the electronically controlled valve, and the first on/off valve, wherein the controller is programmed to regulate a flow of fuel from the dual fuel system to the combustion engine, and the controller is programmed to change between the first and second fuels during operation of the combustion engine while avoiding operating the combustion engine on a blend of the first and second fuels.

7. The dual fuel system of claim 6, wherein the second fuel path comprises a second on/off valve disposed upstream of the second fuel gas regulator and configured to open and close to regulate a flow of the second fuel through the second fuel path in response to control signals from the controller, the controller is coupled to the second on/off valve, and the controller is programmed to simultaneously begin opening the first on/off valve and closing the second on/off valve to enable flow of the first fuel to the combustion engine or to simultaneously closing the first on/off valve and opening the second on/off valve to enable flow of the second fuel to the combustion engine.

8. The dual fuel system of claim 5, wherein the dual fuel system regulates the first fuel at a higher pressure than the first fuel.

9. The dual fuel system of claim 5, wherein the controller is programmed when changing between the first and second fuels during operation of the combustion engine to change engine ignition timing and desired air to fuel ratio to an appropriate engine ignition timing and an appropriate desired air to fuel ratio for whichever of the first and second fuels is oncoming to the combustion engine.

10. The dual fuel system of claim 5, wherein the controller is programmed to automatically change between the first and second fuels during operation of the combustion engine based on a desired process parameter.

11. A system, comprising:
    a dual fuel system configured to couple to a combustion engine, comprising:
    an air and fuel mixer configured to mix air and fuel provided to the combustion engine;
    a first fuel path for a first fuel;
    a second fuel path for a second fuel, wherein the first and second fuels have different physical and chemical properties;
    a common fuel path coupled to the air and fuel mixer and both the first and second fuel paths; and
    a first electronically controlled valve configured to regulate the air to fuel ratio of an air/fuel mixture provided to the combustion engine in response to control signals from a controller, wherein the first electronically controlled valve is located either along the first fuel path or the common fuel path upstream of where the common fuel path is coupled to the air and fuel mixer; and the controller coupled to the air and fuel mixer and the first electronically controlled valve, wherein the controller is programmed to regulate a flow of fuel from the dual fuel system to the combustion engine, and the controller is programmed to change between the first and second fuels during operation of the combustion engine while avoiding operating the combustion engine on a blend of the first and second fuels.

12. The system of claim 11, wherein the first electronically controlled valve is disposed in the common fuel path downstream of a location where the first and second fuel paths are coupled to the common fuel path.

13. The system of claim 11, wherein the first electronically controlled valve is disposed along the first fuel path upstream of a location where the first and second fuel paths are coupled to the common fuel path.

14. The system of claim 13, comprising a second electronically controlled valve disposed along the second fuel path upstream of the location where the first and second fuel paths are coupled to the common fuel path.

15. The system of claim 14, wherein the controller is programmed to separately regulate the flow of the first and second fuels via the first and second electronically controlled valves, respectively.

16. The system of claim 11, wherein the dual fuel system comprises a gas pressure regulation system configured to control a first pressure of the first fuel in relation to the air of the air and fuel mixer and a second pressure of the second fuel in relation to the air of the air and fuel mixer.

17. The system of claim 11, wherein the dual fuel system comprises a mechanical tuning system configured to mechanically tune a performance of both the first and second fuel paths to minimize an amount of adjustment by the first electronically controlled valve to regulate the air to fuel ratio.

18. The system of claim 11, wherein the dual fuel system regulates the first fuel at a higher pressure than the first fuel.

19. The system of claim 11, wherein the controller is programmed when changing between the first and second fuels during operation of the combustion engine to change engine ignition timing and desired air to fuel ratio to an appropriate engine ignition timing and an appropriate desired air to fuel ratio for whichever of the first and second fuels is oncoming to the combustion engine.

20. A dual fuel system for a combustion engine, comprising:

an air and fuel mixer configured to mix air and fuel provided to the combustion engine;

a first fuel path for a first fuel comprising a first fuel gas regulator configured to control a first pressure of the first fuel in relation to an air pressure of the air and fuel mixer and a first fuel manually adjusted valve;

a second fuel path for a second fuel comprising a second fuel gas regulator configured to control a second pressure of the second fuel in relation to an air pressure of the air and fuel mixer and a second fuel manually adjusted valve, wherein the first and second fuels have different physical and chemical properties; and a common fuel path coupled to the air and fuel mixer and both the first and second fuel paths, wherein the common fuel path comprises an electronically controlled valve configured to regulate the air to fuel ratio of an air/fuel mixture provided to the combustion engine in response to control signals from a controller, both the first and second fuel paths are coupled to the common fuel path at a location upstream of the electronically controlled valve, and the electronically controlled valve is located upstream of where the common fuel path is coupled to the air and fuel mixer;

wherein the first and second fuel manually adjusted valves and the first and second gas regulators together are configured to enable the electronically controlled valve to remain within a control range for both engine operating speeds and loads whether the combustion engine is operating under the first fuel or the second fuel.

* * * * *